(12) United States Patent  
Bonin et al.

(10) Patent No.: US 9,014,239 B2
(45) Date of Patent: Apr. 21, 2015

(54) TRANSMISSION-RECEPTION DEVICE OF A NODE OF A RADIO NETWORK

(75) Inventors: Andreas Bonin, Dresden (DE); Daniel Thiele, Dresden (DE); Peter Dietzsch, Dresden (DE)

(73) Assignee: Atmel Corporation, San Jose, CA (US)

( * ) Notice: Subject to any disclaimer, the term of this patent is extended or adjusted under 35 U.S.C. 154(b) by 303 days.

(21) Appl. No.: 13/327,186

(22) Filed: Dec. 15, 2011

(65) Prior Publication Data

US 2012/0177088 A1 Jul. 12, 2012

Related U.S. Application Data

(60) Provisional application No. 61/432,027, filed on Jan. 12, 2011.

(30) Foreign Application Priority Data

Jan. 12, 2011 (DE) .......................... 10 2011 008 440

(51) Int. Cl.
  *H04B 1/38* (2006.01)
  *H04L 5/16* (2006.01)
  *G01S 5/02* (2010.01)

(52) U.S. Cl.
  CPC ..................................... *G01S 5/0289* (2013.01)

(58) Field of Classification Search
  CPC ... G01S 13/84; H04L 2012/5607; H04B 1/10; H04B 17/0067; H04B 1/70754
  USPC ................... 375/295, 299, 316, 219; 342/127
  See application file for complete search history.

(56) References Cited

U.S. PATENT DOCUMENTS

| 5,220,332 | A | 6/1993 | Beckner |
| 6,731,908 | B2 | 5/2004 | Berliner |
| 2006/0044147 | A1* | 3/2006 | Knox et al. ................ 340/686.1 |
| 2007/0241904 | A1* | 10/2007 | Ozaki et al. ................ 340/572.1 |
| 2008/0291089 | A1* | 11/2008 | Seong et al. ................... 342/387 |
| 2009/0080501 | A1* | 3/2009 | Kim ............................... 375/211 |
| 2010/0277360 | A1* | 11/2010 | Lee ............................... 342/125 |
| 2011/0144941 | A1* | 6/2011 | Roberts et al. ................ 702/152 |

FOREIGN PATENT DOCUMENTS

| DE | 100 54 180 | 5/2002 |
| DE | 10 2005 046 172 | 12/2009 |
| DE | 10 2009 060 592 | 7/2010 |

(Continued)

OTHER PUBLICATIONS

Office Action and English Translation for German Patent Application 10 2011 008 440.1, Jul. 26, 2011.
Razavi, Behzad, "RF Microelectronics," 258-269 (Prentice Hall), 1997.

(Continued)

*Primary Examiner* — Shuwang Liu
*Assistant Examiner* — David S Huang
(74) *Attorney, Agent, or Firm* — Baker Botts L.L.P.

(57) ABSTRACT

In one embodiment, a method comprising receiving at a first node a first data frame having a first frequency and a first phase, receiving at the first node a second data frame having a second frequency and a second phase, and determining a first phase difference between the first phase and the second phase by correlating one or more first sampling values associated with data in the first data frame with one or more second sampling values associated with data in the second data frame.

20 Claims, 5 Drawing Sheets

(56) References Cited

FOREIGN PATENT DOCUMENTS

| | | |
|---|---|---|
| DE | 10 2009 060 593 | 7/2010 |
| WO | 02/01247 | 1/2002 |

OTHER PUBLICATIONS

"Part 15.4: Wireless Medium Access Control (MAC) and Physical Layer (PHY) Specifications for Low-Rate Wireless Personal Area Networks (WPANs)," *IEEE Std 802.15.4™-2006*.

* cited by examiner

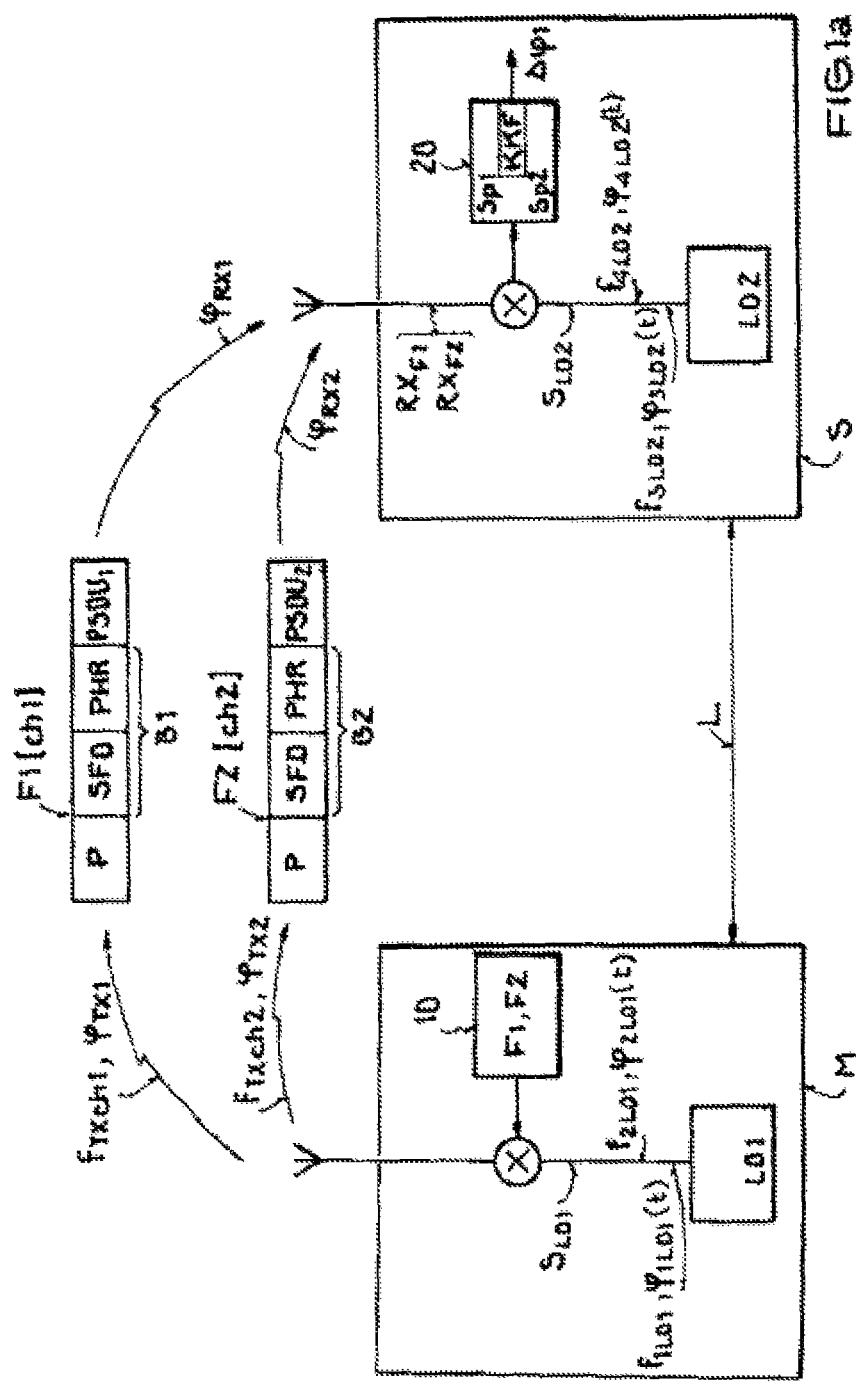

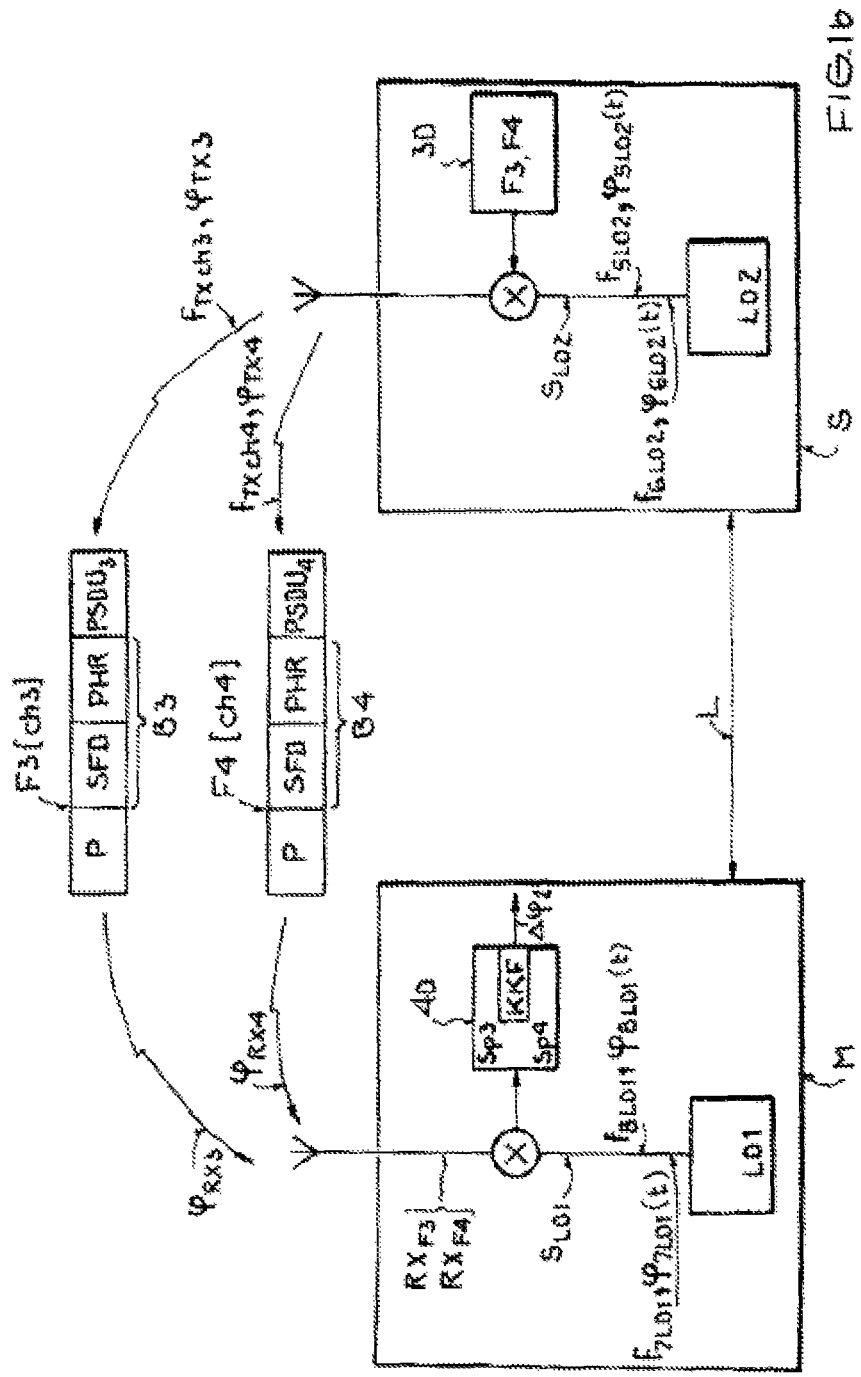

TRANSMISSION-RECEPTION DEVICE OF A NODE OF A RADIO NETWORK

RELATED APPLICATIONS

This application claims the benefit, under 35 U.S.C. §119 (e), of U.S. Provisional Patent Application No. 61/432,027, entitled "Transmission-Reception Device of a Node of a Radio Network," filed 12 Jan. 2011. This application also claims the benefit, under 35 U.S.C. §119(a), of German Patent Application No. 102011008440.1-35, entitled "Verfahren zur Ermittlung einer Phasendifferenz and Send-Empfangs-Vorrichtung eins Knotens eins Funknetzes," filed 12 Jan. 2011.

TECHNICAL FIELD

The present disclosure relates to a transceiver.

BACKGROUND

A transceiver is a device that has both a transmitter and a receiver that are combined and may share common circuitry or a single housing.

BRIEF DESCRIPTION OF THE DRAWINGS

FIG. 1a shows an example schematic representation of two nodes in a radio network.

FIG. 1b shows another example schematic representation of the two nodes in a radio network.

DESCRIPTION OF EXAMPLE EMBODIMENTS

Figure 2:
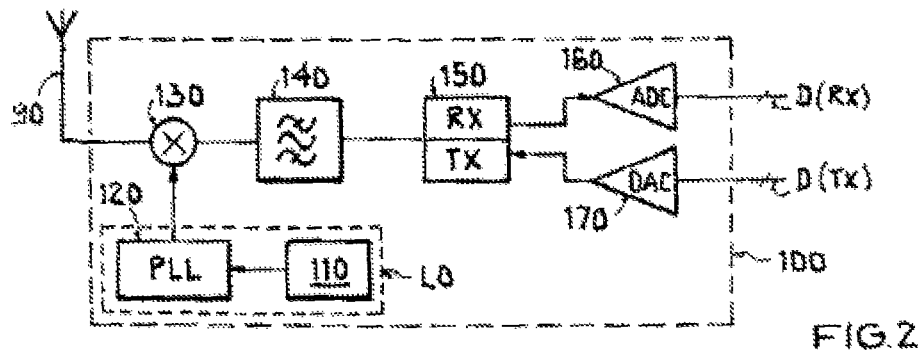
FIG. 2 shows a schematic representation of a block diagram of an example transmission-reception device of a node.

The present disclosure relates to a transceiver of a node of a radio network and a method for determining the phase difference.

In a radio network, it is desirable to localize the nodes of the radio network or at least determine a distance between the nodes. In this way, one may, for example, easily find a defective node. It is also possible to follow slow movements of nodes, for example, of a transport means in a factory.

In U.S. Pat. No. 5,220,332, a distance measurement system is disclosed with a querying device and a transponder, which allows non simultaneous measurements between two objects. A carrier signal is modulated with a (low frequency) modulation signal with a changeable modulation frequency, to determine, by means of a phase measurement or alternatively a transit time measurement, a distance between the querying device and the transponder from the change in the modulation signal.

In WO 02/01247 A2, a method is disclosed for separation measurement between two objects with the help of electromagnetic waves. A query signal of a base station and a response signal of a portable code generator are emitted twice with different carrier frequencies. The carrier frequencies are correlated here, that is, they are mutually dependent. The carrier frequencies are compared to each other, so that a phase shift between the signals may be measured. From this phase shift, the separation between the code generator and the base station is calculated. The query signal and the response signal may then be emitted at different carrier frequencies or at identical carrier frequencies. The carrier frequencies are changed for a new query-response dialogue.

If a transceiver of a node is designed for a sensor network according to the Institute of Electrical and Electronics Engineers (IEEE) 802.15.4-2006 industry standard for a half duplex system, then it cannot transmit and receive at the same time. If this transceiver should serve as active reflector for the phase measurement, the node must consequently store the phase of the received signal by means of a phase locked loop, and after switching from reception to transmission, use the same stored phase again for the transmission. For example, in the case of reception by an additional phase locked loop, the quartz oscillator of the transceiver of the node that works as active reflector, is regulated in such a way that the frequency and the phase of the Local Oscillator (LO) signal of the local oscillator are in agreement with the reception signal. When switching to transmission, the additional phase locked loop must be disconnected, and the frequency synchronized quartz oscillator then continues to run freely. As a result, the transceiver of the node working as an active reflector transmits at an identical or proportional phase position and at the same frequency as before for the reception of a carrier signal. Therefore, the requirements placed on the free running oscillator are very strict with regard to frequency constancy and phase constancy. Disturbances, such as, for example, an excessive response of signals to the integrated circuit, which may cause phase modifications, must be avoided.

In U.S. Pat. No. 6,731,908 B2, a method is disclosed for the determination of the distance between two objects for Bluetooth technology. Here, the frequency is modified by frequency jumps to measure a phase offset for several different frequencies. An object comprises a voltage controlled quartz oscillator in a Phase Locked Loop (PLL), where the PLL is closed during reception and opened during transmission, so that the reception signal and the transmission signal present the same frequency. The phase of the local oscillator signal of the voltage controlled quartz oscillator is coherent with respect to the received signal, due to the synchronization by means of the PLL.

In BEHZAD RAZAVI, RF MICROELECTRONICS 258-269 (Prentice Hall 1997), phase locked loops with charge pumps are disclosed.

In German Patent Application No. DE 10 2009 060 593 A1, a system, a method, and a circuit for distance measurement between two nodes of a radio network are disclosed.

Particular embodiments provide a method for determining a phase difference. Particular embodiments provide a method for determining a phase difference that is compliant with the industry standard IEEE 802.15.4-2006.

Particular embodiments provide a method for determining a phase difference. In particular embodiments, a first frame may be generated by a first node. In particular embodiments, the frame may be in conformity with a frame defined in the industry standard IEEE 802.15.4-2006.

In particular embodiments, a first carrier frequency with a first transmission phase is generated using a first oscillator frequency $f_{1LO1}$ with a first oscillator phase by a first oscillator of the first node.

In particular embodiments of a radio network, the admissible bandwidth, for example in the Industrial, Scientific, and Medical (ISM) band, is subdivided into several frequency channels. In particular embodiments, the several frequency channels may have the identical channel bandwidth. The channel, in the information theoretical sense, is referred to below as a physical channel, which, in the case of a radio network, may be exposed to the influence of disturbances, such as, multiple path propagation, reflections, noise, and the like.

In particular embodiments, the first frame is transmitted from the first node in a first frequency channel with the first carrier frequency and the first transmission phase. In particular embodiments, the data to be sent in the first frame is up modulated to a carrier signal with the first carrier frequency. In particular embodiments, for example, in the 2450 MHz band, an offset quadrature phase-shift keying (O-QPSK) modulation may be used according to the industry standard IEEE 802.15.4-2006.

In particular embodiments, a second frame is generated by the first node. The second frame may also be in conformity with the frame defined in the industry standard IEEE 802.15.4-2006.

In particular embodiments, a second carrier frequency with a second transmission phase is generated using a second oscillator frequency with a second oscillator phase by the first oscillator of the first node.

In particular embodiments, there is a switching from the first oscillator frequency to the second oscillator frequency, where the switching is associated with no phase shift or a deterministic phase shift occurring between the first oscillator phase and the second oscillator phase. In particular embodiments, the oscillator signal may be generated by a phase locked loop with a charge pump.

In particular embodiments, the first node sends the second frame in a second frequency channel with the second carrier frequency and the second transmission phase. In particular embodiments, the same modulation may be used as the one used to send the first frame.

The second node receives the first frame in the first frequency channel with a first reception phase. In particular embodiments, the second node receives the second frame in the second frequency channel with a second reception phase.

In particular embodiments, the phase difference is determined at least from a first difference between the first reception phase and the second reception phase. By determining the phase difference, a phase response in the radio channels used may be determined. Knowing the phase response, properties such as transit time and multiple path propagation of signals may be determined. The phase difference may also be used to reach conclusions regarding the distance of transmission and reception nodes. The described method may be implemented particularly simply in a radio system according to the industry standard IEEE 802.15.4-2006.

Particular embodiments provide a transmission-reception device of a node of a radio network.

In particular embodiments, the transmission-reception device comprises a memory and a processing unit. The memory is arranged for storing first sampling values of a first area of a first frame and second sampling values of a second area of a second frame.

In particular embodiments, the processing unit is arranged to establish a complex correlation between the first sampling values and the associated second sampling values and to determine a difference between a first reception phase and a second reception phase by the complex correlation.

In particular embodiments, a first area of the first frame and a second area of the second frame may present identical data. The phase difference may be determined from the first difference between the first reception phase and the second reception phase using a first complex valued correlation of first sampling values and second sampling values. In particular embodiments, the first sampling values are associated with the data in the first area of the first frame and the second sampling values are associated with the data in the second area of the second frame.

In particular embodiments, for the reception of the first frame in the first frequency channel, a first reception signal with the first reception phase is downmixed by a local oscillator signal with a third oscillator frequency. In particular embodiments, for the reception of the second frame in the second frequency channel, a second reception signal with the second reception phase is downmixed by the local oscillator signal with a fourth oscillator frequency.

In particular embodiments, the third oscillator frequency may be switched to the fourth oscillator frequency. In particular embodiments, the switching may be associated with no phase shift or a deterministic phase shift occurring between the third oscillator phase and the fourth oscillator phase.

In particular embodiments, the second node generates a third frame and a fourth frame, which are transmitted to the first node. In particular embodiments, the third frame and the fourth frame may be transmitted in different channels. In particular embodiments, the third frame and the fourth frame may be transmitted in the first frequency channel and in the second frequency channel. The phase difference may be determined from the first difference and a second difference between a third reception phase and a fourth reception phase.

In particular embodiments, the second difference between the third reception phase and the fourth reception phase is determined using a second complex values correlation of third sampling values and fourth sampling values. In particular embodiments, the third sampling values may be associated with the data in a third area of the third frame, and the fourth sampling values may be associated with the data in a fourth area of the fourth frame.

In particular embodiments, the transmission-reception device comprises a local oscillator for generating a local oscillator signal with a first oscillator frequency with a first oscillator phase for downmixing a reception signal with the first frame and with a second oscillator frequency with a second oscillator phase for downmixing the reception signal with the second frame. The oscillator may be arranged so that it switches from the first oscillator frequency to the second oscillator frequency. The switching is associated with no phase shift or a deterministic phase shift occurring between the first oscillator phase and the second oscillator phase. Particular embodiments take into account or compensate for the deterministic phase shift in the determination of the phase difference.

In particular embodiments, the transmission-reception device comprises a reference oscillator for generating a reference clock signal. The oscillator may be arranged so it generates the first oscillator frequency and the second oscillator frequency from the reference clock signal in a phase-locked manner.

The transmission-reception device comprises an analog-digital converter for the generation of the first sampling values and the second sampling values. In particular embodiments, the analog-digital converter may be installed and connected for sampling using the reference clock signal.

In particular embodiments, the transmission-reception device may be installed so that it controls a selection of the first sampling values of the first area of the first frame and of the second sampling values of the second area of the second frame by counting cycles of the reference clock signal. In particular embodiments, for example, for this purpose, time slots may be established, and the sampling values are established in reference to a start of the respective time slot.

The above-described particular embodiments may be taken alone or in combination. It is possible to combine all the embodiments with each other. Some combinations are explained in the description of the example embodiments shown in the figures. However, the possibilities of combinations of the embodiments presented are not exhaustive.

FIG. 1a shows a schematic representation of an example transmission between two nodes M, S in a radio network. A first node M of the radio network is separated from a second node S of the radio network by a distance L.

In particular embodiments, in the measurement process through the two nodes M, S, a phase difference $\Delta\phi$ between different radio channel frequencies may be determined. With the determined phase difference, properties, such as, transit time, distance L, or multiple path propagation in the transmission medium (e.g., air) may be determined. At least two participating nodes M, S are needed, which may exchange data via radio.

The participating nodes M, S may also be referred to below as master M (master) and slave S (slave).

In particular embodiments, the first node M, as master, generates a first frame F1 by a transmission unit 10. The first frame F1, shown in FIG. 1a, comprises a preamble P, a start-of-frame delimeter SFD, a physical (PHY) header (PHY Header) PHR, and PHY service data unit PSDU1. The first frame F1 shown in FIG. 1a complies with the industry standard IEEE 802.15.4-2006.

In the first node M, a local oscillator signal $S_{LO1}$ with a first oscillator frequency $f_{1LO1}$ is generated by a first oscillator $LO_1$ of the first node M with a first oscillator phase $\phi_{1LO1}(t)$. Later, the first oscillator $LO_1$ may also be switched to a second oscillator frequency $f_{2LO1}$ (see below). The first oscillator frequency $f_{1LO1}$ is set for the generation of a first carrier frequency $f_{TXch1}$ of a first frequency channel CH1. In particular embodiments, the carrier frequency $f_{TXch1}$ may be a center frequency of the signal transmitted by radio in the center of the first frequency channel CH1. In particular embodiments, the signal to be sent is upmixed from the baseband directly by the local oscillator signal $S_{LO1}$ of the first oscillator $LO_1$ with the oscillator frequency $f_{1LO1}$. In particular embodiments, the transmission frequency $f_{TXch1}$ corresponds to the first oscillator frequency $f_{1LO1}$. The first channel ch1 is the transmission medium between the antennas of the two nodes M, S.

The first node M transmits the first frame F1 with the first carrier frequency $f_{TXch1}$ and a first transmission phase $\phi_{TX1}$ which is associated with the first oscillator phase $\phi_{1LO1}(t)$, in a first time slot $TS_1$. An example embodiment of the first time slot $TS_1$ is shown, for example, in FIG. 7b.

The first frame F1 is received by the second node S. In particular embodiments, first sampling values Sp1 are generated from the reception signal $RX_{F1}$.

In particular embodiments, the first node M, as master, also generates a second frame F2 by the transmission unit 10. Particular embodiments of the second frame F2, an example of which is shown in FIG. 1a, also comprise a preamble, a start-of-frame delimeter SFD, a PHY header PHR, and PHY service data unit PSDU2. The example second frame F2 shown in FIG. 1a complies with the industry standard IEEE 802.15.4-2006.

In particular embodiments, the first node M transmits the second frame F2 with the second carrier frequency $f_{TXch2}$ and a second transmission phase $\phi_{TX2}$, which is associated with the second oscillator phase $\phi_{2LO1}(t)$, in a second time slot $TS_2$. An example embodiment of the second time slot $TS_2$ is shown, for example, in FIG. 7b.

The second frame F2 is then also received by the second node S. In particular embodiments, second sampling values Sp2 are generated from the reception signal $RX_{F2}$. In particular embodiments, a cross correlation filter KKF of a reception unit 20 of the second node S calculates a difference $\Delta\phi_1$ between the first reception phase $\phi_{RX1}$ and the second reception phase $\phi_{RX2}$.

The first node M and the second node S in each case present a reference oscillator 110 for the generation of a reference clock signal $clk_{REF}$ as time base. An example reference clock signal, reference clock signal $clk_{REF}$, is shown schematically in FIG. 7b. The reference oscillator 110 of the first node M, and the reference oscillator 110 of the second node S may comprise quartz oscillators with a clock frequency of, for example, 16 MHz, to achieve high precision. In particular embodiments, the time slots $TS_1$ and $TS_2$ may be of identical length in the first node M (here as transmitter) and in the second node S (here as receiver), and predetermined in a fixed manner in the nodes M, S. In particular embodiments, for example, the length of a time slot $TS_1$, $TS_2$ may be 100 μs. The limits, that is the start and end of each time slot $TS_1$, $TS_2$, are established by the reference clock signal $clk_{REF}$. The sampling instant in the analog-digital converter 160 for the sampling values Sp1, Sp2 is also established by the reference clock signal $clk_{REF}$. In particular embodiments, the reference clock signal $clk_{REF}$ also establishes a separation from a first area B1 with the first sampling values Sp1 and the start of the first time slot $TS_1$, and from a second area B2 of the second sampling values Sp2 and the start of the second time slot $TS_2$, in each case as a time difference $\Delta TS$, as shown in the example embodiment in FIG. 7b. In particular embodiments, the third oscillator frequency $f_{3LO2}$ and the fourth oscillator frequency $f_{4LO2}$ are also generated from the reference clock signal $clk_{REF}$, by the phase locked loop PLL, so that the third oscillator phase $\phi_{3LO2}(t)$ and the fourth oscillator phase $\phi_{4LO2}(t)$ is phase locked with respect to the phase of the reference clock signal $clk_{REF}$. The system may be phase locked, given that the sampling instants of the sampling values Sp1, Sp2, and the limits of the time slots $TS_1$, $TS_2$ with respect to the reference clock signal $clk_{REF}$ are phase locked.

In particular embodiments, the second sampling values Sp2 may be shifted with respect to the first sampling values Sp1 due to the properties of the physical transmission channel, so that the difference $\Delta\phi_1$ between the first reception phase $\phi_{RX1}$ and the second reception phase $\phi_{RX2}$ may be determined from the first sampling values Sp1 and the second sampling values Sp2 by the correlation.

In the example embodiment shown in FIG. 1a, for the reception of the first frame F1, the reception signal $RX_{F1}$ may be downmixed by a mixer. For downmixing a local oscillator signal $S_{LO2}$, the second node S sets a third oscillator frequency $f_{3LO2}$ of a second oscillator $LO_2$ of the second node S with a third oscillator phase $\phi_{3LO2}(t)$. The third oscillator frequency $f_{3LO2}$ is here associated with a first reception frequency. In particular embodiments, for example, if the reception signal $RX_{F1}$, which is received via an antenna of the second node S, is downmixed directly into the baseband (zero IF) by the local oscillator signal $S_{LO2}$ of the second oscillator $LO_2$, the reception frequency corresponds to the third oscillator frequency $f_{3LO2}$. In particular embodiments, downmixing to an intermediate frequency may be done as well (not shown).

In particular embodiments, the second node S receives the first frame F1 in the first frequency channel CH1 with a first reception phase $\phi_{RX1}$:

$$\varphi_{RX1} = \varphi_{OFS1} + 2\pi \cdot \frac{L}{\lambda_{CH1}} \qquad (1)$$

where $\phi_{RX1}$ is the first reception phase, $\phi_{OFS1}$ is a mean phase offset, L is the distance between the nodes M, S, and $\lambda_{CH1}$ is a wavelength at the first carrier frequency $F_{TXch1}$.

Figure 7A:
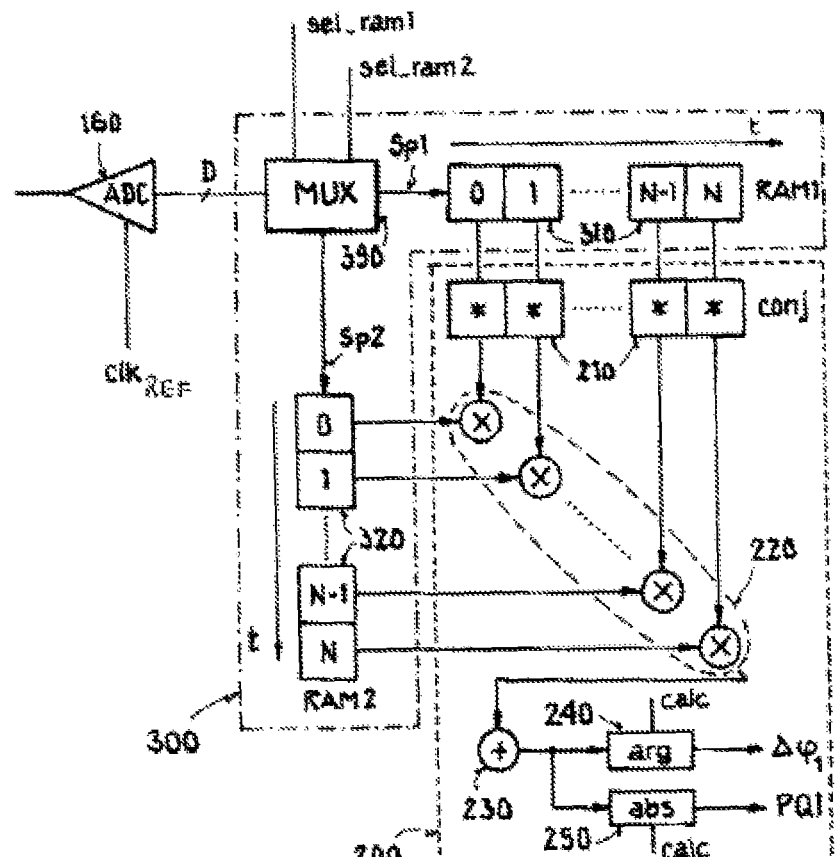
FIG. 7a shows a schematic block diagram of an example circuit.
Figure 7B:
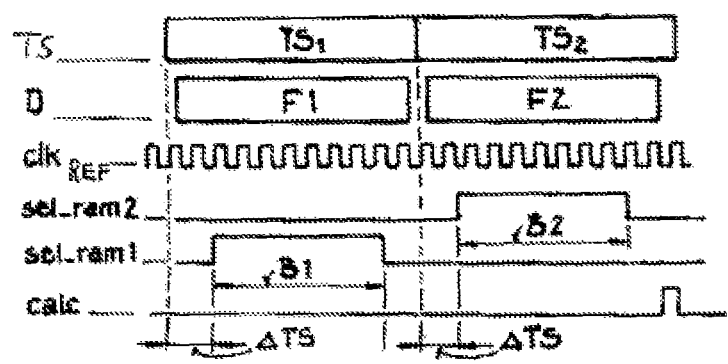
FIG. 7b shows a schematic diagram for the example representation of signals.

In particular embodiments, for a second time slot $TS_2$, shown as an example embodiment in FIG. 7b, after the transmission of the first frame F1, the first oscillator $LO_1$ is switched from the first oscillator frequency $f_{1LO1}$ to a second oscillator frequency $f_{2LO1}$ with a second oscillator phase $\phi_{2LO1}(t)$. In the first node M, a second carrier frequency $f_{TXch2}$ is generated on the basis of the second oscillator frequency $f_{2LO1}$. Switching from the first oscillator frequency $f_{1LO1}$ to the second oscillator frequency $f_{2LO1}$ is not associated with a phase shift or only with a deterministic phase shift $\phi_{SW}$ between the first oscillator phase $\phi_{1LO1}(t)$ and the second oscillator phase $\phi_{2LO1}(t)$. In particular embodiments, the phase shift is not random.

Figure 4:
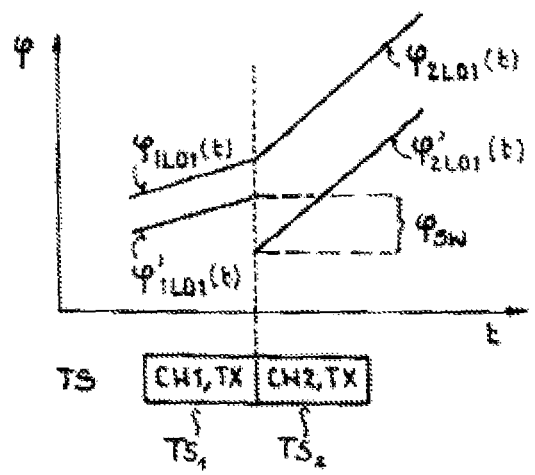
FIG. 4 shows a schematic representation for the example representation of phases.

FIG. 4 shows example consecutive time slots TS. In the first time slot $TS_1$, transmission occurs in the first frequency channel CH1 (TX), and in the subsequent second time slot, transmission occurs in the second frequency channel CH2 (TX). An example phase $\phi_{1LO1}(t)$ of an oscillator $LO_1$ before the switching instant between the time slots $TS_1$ and $TS_2$, and an example phase $\phi_{2LO1}(t)$ of the oscillator $LO_1$ after the switching instant between the time slots $TS_1$ and $TS_2$ are shown schematically in the same diagram. In particular embodiments, such as in the top example, when switching from the first oscillator frequency $f_{1LO1}$ to the second oscillator frequency $f_{2LO1}$, no phase shift occurs between the first oscillator phase $\phi_{1LO1}(t)$ and the second oscillator phase $\phi_{2LO1}(t)$.

In particular embodiments, in the example shown at the bottom, at the instant of switching from the first oscillator frequency $f_{1LO1}$ to the second oscillator frequency $f_{2LO1}$, a phase shift $\phi_{SW}$ occurs between the first oscillator phase $\phi'_{1LO1}(t)$ and the second oscillator phase $\phi'_{2LO1}(t)$. If the phase shift $\phi_{SW}$ is deterministic, then the phase shift $\phi_{SW}$ may be taken into consideration in the calculation of a phase difference $\Delta\phi$. In particular embodiments, for example, the phase shift $\phi_{SW}$ due to the hardware is $\pi/16$.

In particular embodiments, the first node M generates a second frame F2. The second frame F2 is transmitted with the second carrier frequency $f_{TXch2}$ and a second transmission phase $\phi_{TX2}$ is associated with the second oscillator phase $\phi_{2LO1}(t)$ in a second time slot $TS_2$.

After the reception of the first frame F1, in the example embodiment shown in FIG. 1a, the second oscillator $LO_2$ is also switched from the third oscillator frequency $f_{3LO2}$ with a third oscillator phase $\phi_{3LO2}(t)$ to a fourth oscillator frequency $f_{4LO2}$ with a fourth oscillator phase $\phi_{4LO2}(t)$. The switching from the third oscillator frequency $f_{3LO2}$ to the fourth oscillator frequency $f_{4LO2}$ may be associated with no phase shift, or only with a deterministic phase shift $\phi_{SW}$, occurring between the third oscillator phase $\phi_{3LO2}(t)$ and the fourth oscillator phase $\phi_{4LO2}(t)$. In particular embodiments, the phase shift may not be random.

The second frame F2 is received by the second node S. In particular embodiments, second sampling values Sp2 are generated from the reception signal $RX_{F2}$. In the example embodiment shown in FIG. 1a, the reception signal $RX_{F2}$ is downmixed by the mixer for the reception of the second frame F2. For the downmixing by the local oscillator signal $S_{LO2}$, the second node sets a fourth oscillator frequency $f_{4LO2}$ of the second oscillator $LO_2$ of the second node S with a fourth oscillator phase $\phi_{4LO1}(t)$. The fourth oscillator frequency $f_{4LO2}$ here is associated with a second reception frequency. In particular embodiments, for example, if the reception signal $RX_{F2}$ received via an antenna of the second node S is downmixed directly in the baseband (zero IF) by the local oscillator signal $S_{LO2}$ of the second oscillator $LO_2$, the reception frequency corresponds to the fourth oscillator frequency $f_{4LO2}$. In particular embodiments, downmixing to an intermediate frequency may be done as well (not shown).

In particular embodiments, the second node S receives the second frame F2 in the second frequency channel CH2 with a first reception phase $\phi_{RX2}$:

$$\varphi_{RX2} = \varphi_{OFS1} + 2\pi \cdot \frac{L}{\lambda_{CH2}} \qquad (2)$$

where $\phi_{RX2}$ is the first reception phase, $\phi_{OFS1}$ is a mean phase offset, L is the distance between the nodes M, S, and $X_{CH2}$ is a wavelength at the second carrier frequency $F_{TXch2}$. A change in the phase due to the transit time in the physical channel is indicated with the term $2\pi L/\lambda_{CH1}$ in formula (1) above, and with the term $2\pi L/\lambda_{CH2}$ in formula (2), where L is the length of the path covered by the radio signal.

In particular embodiments, the second node S is set to determine a difference $\Delta\phi_1$ of the reception phases $\phi_{RX1}$, $\phi_{PRX2}$, by correlation of the complex valued sampling values Sp1, Sp2, of the first frame F1 and of the second frame F2, where the following holds:

$$\Delta\varphi_1 = \varphi_{RX1} - \varphi_{RX2} \qquad (3)$$

$$\Delta\varphi_1 = 2\pi \cdot \frac{L}{\lambda_{CH2} - \lambda_{CH1}}$$

$$\Delta\varphi_1 = 2\pi \cdot \frac{L}{\lambda_{\Delta f(CH2,CH1)}}$$

$$\Delta\varphi_1 = 2\pi \cdot \frac{L \cdot \Delta f_{(CH2,CH1)}}{C}$$

where $\Delta f_{(CH2, CH1)}$ is a frequency difference between the first carrier frequency $f_{TXch1}$ and the second carrier frequency $f_{TXch2}$. Knowing the difference $\Delta\phi_1$ between the reception phases $\phi_{RX1}$ and $\phi_{RX2}$, and the frequency difference $\Delta f_{(CH2, CH1)}$ of the two carrier frequencies $f_{TXch1}$, $f_{TXch2}$, the separation L may be determined.

In particular embodiments, if with the first node M and the second node S, a coherent digital reception path is present, the phase of the correlation product, which was determined by the coherent receiver, may be used. In particular embodiments, the frames F1, F2 do not necessarily have to have the same data, for the correlation with the coherent receiver.

In particular embodiments, if no coherent reception path is present, the first frame F1 and the second Frame F2 present areas B1, B2 with the same data. In an example embodiment shown in FIG. 1a, the first frame F1 comprises a first area B1 with data in the form of a start-of-frame delimiter SFD and a data header PHR, and the second frame F2 comprises a second area B2 with identical data in the form of the start-of-frame delimiter SFD and the data header PHR.

The difference $\Delta\phi_1$ of the reception phases $\phi_{RX1}$, $\phi_{RX2}$ is determined using a complex valued correlation of the first sampling values Sp1 of the first area B1 of the first frame F1 and of the second sampling values Sp2 of the second area B2 of the second frame F2. In particular embodiments, for the complex valued correlation, it is necessary that for each sample value $Sp_K$ the information of the amplitude $A_K$ and of the (relative) phase $\phi_K$ of the reception signal $RX_{F1}$, $RX_{F2}$ is available.

Thus, the following holds for each sampling value $Sp_K$:

$$Sp_K = \text{Re}(Sp_K) + i \cdot \text{Im}(Sp_K) = A \cdot e^{i \cdot \varphi_K} \tag{4}$$

$$A_K = |Sp_K| \tag{5}$$

$$\varphi_K = \arg(Sp_K) = a\tan2\left(\frac{\text{Im}(Sp_K)}{\text{Re}(Sp_K)}\right) \tag{6}$$

The complex cross correlation is generally defined as:

$$(f * g)[n] := \sum_{m=-\infty}^{+\infty} f^*[m] \cdot g[m+n] \tag{7}$$

where f* is the conjugate of f. The complex valued first sampling values Sp1 and the complex valued second sampling values Sp2 present the same number N. The complex valued first sampling values Sp1 and the complex valued second sampling values Sp2 of the frames F1, F2 are correlated with each other for a relative time shift of zero, thus n=0 and $$C_{ph} = (Sp1 * Sp2)[0] := \sum_{m=0}^{N} Sp1^*[m] \cdot Sp2[m] \tag{8}$$

where Sp1* is the conjugate of Sp1. The result is thus a complex number $c_{ph}$. A mean phase angle difference $\Delta\phi_1$ between the second frame F2 and the first frame F1 is determined from:

$$\Delta\phi_1 = \arg(c_{ph}) = a\tan 2(\text{Im}(c_{ph}), \text{Re}(c_{ph})) \tag{9}$$

In particular embodiments, for this determination of the difference $\Delta\phi_1$ it may be sufficient if only the two areas B1, B2 of the frames F1 and F2 that are correlated contain the same data. In particular embodiments, the other data in the frames F1 and F2 may differ and be used for the transmission of service data $PSDU_1$, $PSDU_2$, $PSDU_3$, and $PSDU_4$. The two frames F1, F2 may have the same frequency offset $\phi_{OFS}$ and the same signal properties, such as distortion and the like, because they originate from the same transmitter, are transmitted over the same air path, and are received by the same receiver. The sampling values Sp1, Sp2 of the baseband data correlate thus perfectly and differ only in the difference $\Delta\phi_1$ of the phase, which is to be measured. As a result of the formation of the difference $\Delta\phi_1$, the phase offsets $\phi_{OFS}$ falls out. This includes the phase offset of the phase locked loop (transmitter/receiver) and transit times in the integrated circuit (baseband, front end).

In particular embodiments, an indicator of the quality of the obtained difference phase measured value $\Delta\phi_1$ may be obtained from:

$$PQI = \text{abs}(c_{ph}) \tag{10}$$

In particular embodiments, a transmission-reception device comprises, for the calculation of the difference $\Delta\phi_1$, a memory for storing the first sampling values Sp1 of the first area B1 of the first frame F1 and of the second sampling values Sp2 of the second area B2 of the second frame F2. In particular embodiments, the transmission-reception device comprises a processing unit. In particular embodiments, the processing unit may be a microcontroller of the node and the memory may be connected to the microcontroller. In particular embodiments, for example, the memory may be a RAM that is connected with the microcontroller by a bus.

In particular embodiments, the processing unit obtains a complex valued correlation of the first sampling values Sp1 with the second sampling values Sp2, and determines the difference $\Delta\phi_1$ between the first reception phase $\phi_{RX1}$ and the second reception phase $\phi_{RX2}$ by the complex correlation. In particular embodiments, the processing unit may be configured so that it performs the above-explained computations in a second program run. In particular embodiments, all the needed sampling values Sp1, Sp2 may first be loaded in the memory. In particular embodiments, then the program run is started for the computation of the difference $\Delta\phi_1$ between the first reception phase $\phi_{RX1}$ and the second reception phase $\phi_{RX2}$.

In FIG. 7a, another example embodiment is represented schematically and has a processing unit 200 and a memory 300. In the example embodiment shown in FIG. 7a, the functions for the calculation of the difference $\Delta\phi_1$ between the first reception phase $\phi_{RX1}$ and the second reception phase $\phi_{RX2}$ may be implemented using appropriate hardware. In particular embodiments, the transmission-reception device comprises an analog-digital converter ADC 160, which is clocked for the formation of sampling data D by a sampling clock $clk_{REF}$. The memory 300 comprises a multiplexer MUX 390. At the reception of the first area B1 of the first frame F1 during the first time slot $TS_1$, the first sampling values Sp1 may be read in first memory cells 310 of 0, 1 to N of a first memory area RAM1, by a first control signal sel_ram1 at a control input of the multiplexer MUX 390. At the reception of the second area B2 of the second frame F2 during the second time slot $TS_2$, the second sampling values Sp2 may be read in second memory cells 320 of 0, 1 to N of a second memory area RAM2, by a second control signal sel_ram2 at a control input of the multiplexer MUX 390.

In particular embodiments, the processing unit 200 comprises a first unit 210 for the formation of the conjugate Sp1* of each first sampling value Sp1. The complex conjugated first sampling values Sp1* are multiplied in each case by the associated second sampling values Sp2 by a second unit 220 of the processing unit 200 according to formula (8), and the products are added by a third unit 230 of the processing unit 200 according to formula (8). A fourth unit 240 and a fifth unit 250 of the processing unit 200 are controlled by the signal calc. The fourth unit 240 here calculates the difference $\Delta\phi_1$ according to formula (9) and the fifth unit calculates the indicatory PQI according to formula (10). The time slots $TS_1$, $TS_2$, the frames F1, F2, and the signals $clk_{REF}$, sel_ram1, sel_ram2 and calc are shown in the example embodiment of FIG. 7b. In particular embodiments, the first area B1 is separated from the start of the first time slot $TS_1$ by the time difference $\Delta TS$. Similarly, the second area B2 is separated from the start of the second time slot $TS_2$ by the time difference $\Delta TS$.

In FIG. 2, an analog part 100 of an example transmitter-receiver device is shown schematically as a block diagram. In FIG. 2, in order to simplify the illustration of an example embodiment, not all the components of the analog part are represented, for example, there is no amplifier. In particular embodiments, for example, the analog part 100 comprises a local oscillator LO with an oscillator quartz 110 and a phase locked loop PLL. The local oscillator LO is connected with a mixer 130 to downmix the reception signal or to upmix for a transmission signal. An antenna 90 is connected with the analog part 100 of the transmitter receiver device. Particular embodiments provide an analog filter 140, a switch 150, an analog-digital converter 160 for the output of baseband data D(RX), and a digital-analog converter 170 for the conversion of the data to be sent D(TX).

In particular embodiments, the phase of the reception signal $RX_{F1}$, $RX_{F2}$ is determined not only by the physical transmission channel, but also by the oscillators 120 in the transceivers. In particular embodiments, it is necessary for the first oscillator frequency $f_{1LO1}$ to be switched to the second oscillator frequency $f_{2LO1}$, without a non-deterministic phase shift occurring between the first oscillator phase $\phi_{1LO1}(t)$ and the second oscillator phase $\phi_{2LO1}(t)$ with the switching.

Figure 3:
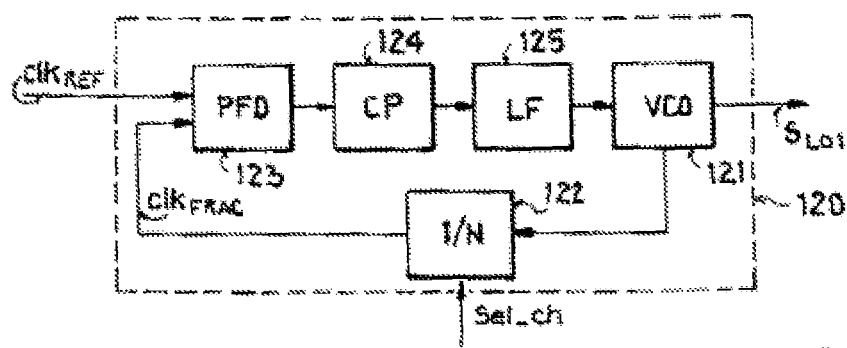
FIG. 3 shows a schematic representation of an example phase locked loop.

An example embodiment of such an oscillator 120 is shown in FIG. 3 as charge pump PLL. In particular embodiments, the phase locked loop 120 comprises a voltage controlled oscillator VCO 121, a divider 122, a phase comparator PFD 123, for comparing the feedback signal $clk_{FRAC}$ and the reference signal $clk1_{REF}$, a charge pump CP 124, and a loop filter LF 125. The example phase locked loop 120 of FIG. 3 comprises a negligible static phase error, not taking into account mismatch and offsets. In particular embodiments, a static phase error at the input of the phase comparator PFD 123 would be reinforced maximally by the charge pump CP 124, and may thus practically not occur. In particular embodiments, for example, when switching the oscillator frequency from $f_{1LO1}$ to $f_{2LO2}$, the frequency jump may not be greater than the disengagement or pull-out range. This means that when applying a frequency jump of the feedback signal $clk_{FRAC}$ or of the reference signal $clk_{REF}$ to the input of the phase comparator PFD 123, the engaged phase locked loop 120 may follow in this area without skipping a period or cycle slip. The phase locked loop 120 thus shows a normal engaged regulation behavior. In particular embodiments of a transmission-receiving device, when using the phase locked loop 120, the switching of the carrier frequency $f_{TXCH1}$, $f_{TXCH2}$ may be produced by the change in the scaling factor of the divider 122 of the phase locked loop 120. This leads to a change in the feedback signal $clk_{FRAX}$.

Figure 5:
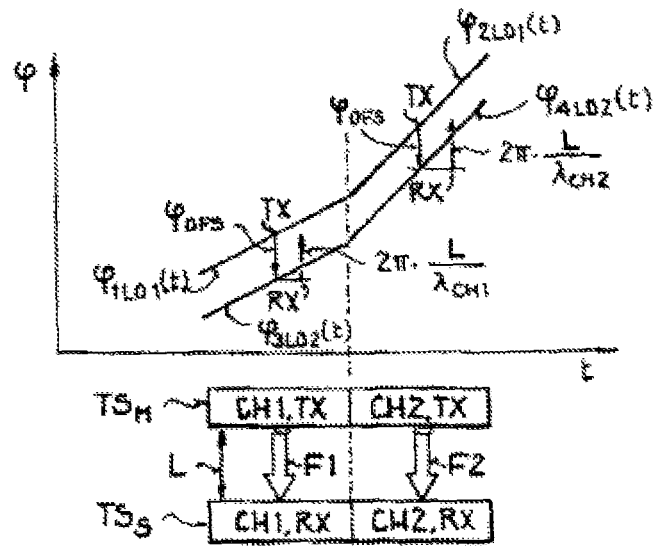
FIG. 5 shows an another schematic diagram for the example representation of phases.

In an example embodiment shown in FIG. 5, the first node M and the second node S switch simultaneously from the first frequency channel CH1 to the second frequency channel CH2. In particular embodiments, the time slots $TS_M$ in the first node M and the time slots $TS_S$ in the second node S are synchronized. The example embodiment shows a plot against time t of the course of the first oscillator phase $\phi_{1LO1}(t)$ of the first oscillator $LO_1$ of the first node M during the first time slot before the switching of the oscillator frequency $f_{1LO1}$, $F_{2LO1}$, and of the course of the second oscillator phase $\phi_{2LO1}(t)$ during the second time slot after the switching of the oscillator frequency $f_{1LO1}$, $f_{2LO1}$.

A schematic plot against time t is shown for the course of the third oscillator phase $\phi_{3LO2}(t)$ of the second oscillator $LO_2$ of the second node S during the first time slot before the switching of the oscillator frequency $f_{3LO2}$, $f_{4LO2}$, and for the course of the fourth oscillator phase $\phi_{4LO2}(t)$ during the second time slot after the switching of the oscillator frequency $f_{3LO2}$, $f_{4LO2}$. In particular embodiments, the phase offset $\phi_{OFS}$ between the phase locked loop 120 of the first node M and the phase locked loop 120 of the second node S may remain constant. Based on the determination of the difference according the formula (2), the phase offset $\phi_{OFS}$ is subtracted out.

Figure 6:
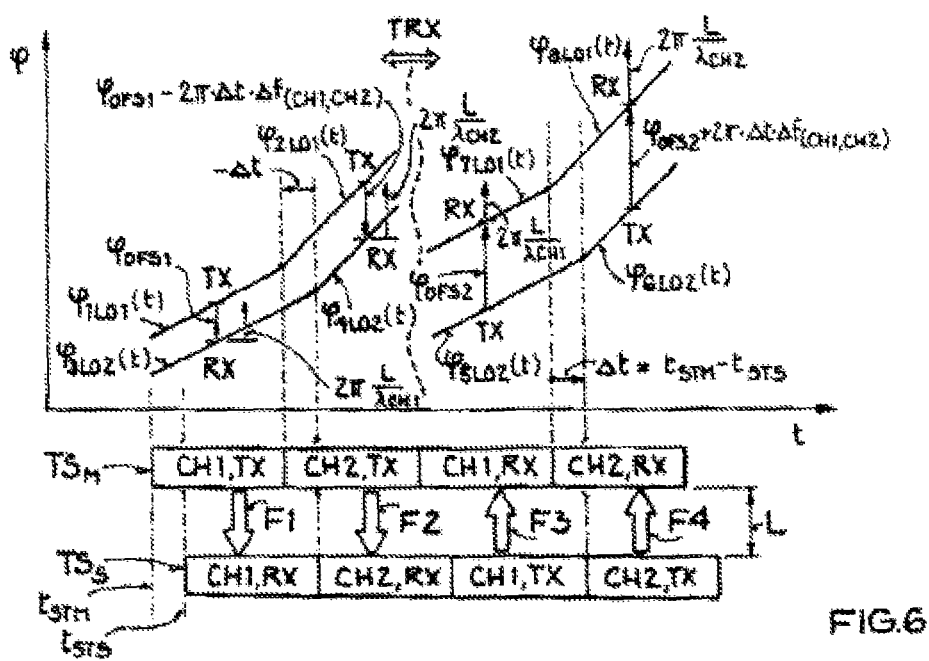
FIG. 6 shows a third schematic diagram for the example representation of phases.

FIG. 6 shows a schematic diagram of an example embodiment with unsynchronized nodes M, S. The consecutive time slots $TS_M$ of the first node M and the consecutive times slots $TS_S$ of the second node S are mutually shifted by a time difference $\Delta t = t_{STM} - t_{STS}$. In the example embodiment shown in FIG. 6, a first frame F1 and a third frame F3 are transmitted in a first frequency channel CH1. In particular embodiments, a second frame F2 and a fourth frame F4 are transmitted in a second frequency channel CH2, which is different from the first frequency channel CH1.

If the first node M sends the first frame F1 and the second frame F2, the following holds for a first difference 41:

$$\Delta \varphi_1 = \varphi_{RX2} - \varphi_{RX1} \qquad (11)$$

$$= 2\pi \frac{L}{\lambda_{\Delta f(CH2,CH1)}} - 2\pi \cdot \Delta t \cdot \Delta f_{(CH2,CH1)}$$

After the first frame F1 and the second frame F2 have been transmitted, the first node M switches from transmitting to receiving, and the second node S from receiving to transmitting (TRX). In particular embodiments, the second node S sends the third frame F3 and the fourth frame F4, and the following holds for a second difference 42:

$$\Delta \varphi_2 = \varphi_{RX4} - \varphi_{RX3} \qquad (12)$$

$$= 2\pi \frac{L}{\lambda_{\Delta f(CH2,CH1)}} + 2\pi \cdot \Delta t \cdot \Delta f_{(CH2,CH1)}$$

By the addition of the first difference $\Delta \phi_1$ and the second difference $\Delta \phi_2$, the $\Delta t$ dependent error terms mutually cancel out, and the terms dependent on the distance L, double. The phase difference $\Delta \phi$ caused by the transit time is thus:

$$\Delta \varphi = \frac{1}{2}(\Delta \varphi_1 - \Delta \varphi_2) \qquad (13)$$

$$= \frac{1}{2}\left(2\pi \frac{L}{\lambda_{\Delta f(CH2,CH1)}} + 2\pi \frac{L}{\lambda_{\Delta f(CH2,CH1)}}\right)$$

$$\Delta \varphi = 2\pi \frac{L}{\lambda_{\Delta f(CH2,CH1)}}$$

The distance L between the first node M and the second node S is calculated with:

$$L = \frac{\Delta \varphi \cdot \lambda_{\Delta f(CH2,CH1)}}{2\pi} = \frac{\Delta \varphi \cdot c}{2\pi \cdot \Delta f_{(CH2,CH1)}} \qquad (14)$$

where c is the speed of light.

In particular embodiments, for example, the first node M and the second node S need to synchronize only roughly over the air interface by exchanging data packets whose arrival time is determined with an admissible tolerance (approximately). Between the switching instants of the oscillator frequencies $f_{1LO1}$ to $f_{8LO1}$ and $f_{3LO2}$ to $f_{6LO2}$, of the phase locked loops 120 of the two nodes M, S, a synchronization imprecision $\Delta t = t_{STM} - t_{STS}$ may occur with the frequency change by $\Delta f$. This produces a change in the phase offsets between the phase locked loops 120 of the first node M and of the second node S, with the now no longer temporally synchronous channel frequency change, by:

$$\pm \Delta t \cdot 2\pi \Delta f_{CH2,CH1)} \quad (15)$$

In particular embodiments, the change is $+\Delta t\, 2\pi\Delta f$ if the first node M is the receiver. In particular embodiments, the change is $-\Delta t\, 2\pi\Delta f$ if the second node S is the receiver. The reversal of the sign is due to the fact that the phase is always measured by the receiver that is relative to the receiver. To compensate for this synchronization imprecision $\Delta t$, the transmission and reception modes are exchanged with the first node M and second node, and the same measurement is repeated. The consecutive time slots $TS_M$, $TS_S$ are not interrupted, thus only the sign of the synchronization imprecision $\Delta t$ changes, and the phase error due to the synchronization imprecision $\Delta t$ is compensated, if the two determined values $\Delta\phi_1$, $\Delta\phi_2$ are added according to formula (13). In particular embodiments, the time slots $TS_M$, $TS_S$, may be generated here from a quartz stabilized reference clock.

In FIG. 6, a corresponding example embodiment is shown in which the second node S is switched at the time difference $\Delta t$ after the first node M, from the first frequency channel CH1 to the second frequency channel CH2. In particular embodiments, the time slots $TS_M$ in the first node M and the time slot $TS_S$ in the second node S are mutually shifted. The diagram shows a plot against time t for the course of the first oscillator phase $\phi_{1LO1}(t)$ of the first oscillator $LO_1$ of the first node M during the first time slot before the switching of the oscillator frequency $f_{1LO1}$, $f_{2LO1}$ by the first node M. In particular embodiments, the plot shows the course against time t of the second oscillator phase $\phi_{2LOO1}(t)$ during the second time slot after the switching of the oscillator frequency $f_{1LO1}$, $f_{2LO1}$ of the first node M.

The plot against time t of the course of the third oscillator phase $\phi_{3LO2}(t)$ of the second oscillator $LO_2$ of the second node S during the first time slot before the switching of the oscillator frequency $f_{3LO2}$, $f_{4LO2}$ in the second node S, and of the course of the fourth oscillator phase $\phi_{4LO2}(t)$ during the second time slot after the switching of the oscillator frequency $f_{3LO2}$, $f_{4LO2}$ of the second node S are also shown.

In particular embodiments, the phase offset $\phi_{OFS}$ between the phase locked loop 120 of the first node M and the phase locked loop 120 of the second node S remains constant as well. Due to the determination of the difference according to formula (2), the phase offset $\phi_{OFS}$ is subtracted out. In particular embodiments, the synchronization imprecision $-\Delta t$ may occur.

In particular embodiments, the TRX switch then occurs between transmission and reception in the two nodes M, S. The figure also shows the further course of the fifth oscillator phase $\phi_{5LO1}(t)$ of the second oscillator $LO_2$ of the second node S during the third time slot before the switching of the oscillator frequency $f_{5LO2}$, $f_{6LO2}$ by the second node S. Also shown is an example plot against time t of the course of the sixth oscillator phase $\phi_{6LO2}(t)$ during the fourth time slot after the switching of the oscillator frequency $f_{5LO2}$, $f_{6LO2}$ of the second node S.

Particular embodiments provide an example plot against time t for the course of the seventh oscillator phase $\phi_{7LO1}(t)$ of the first oscillator $LO_1$ of the first node M during the third time slot before the switching of the oscillator frequency $f_{7LO1}$, $f_{8LO1}$ in the first node M, and for the course of the eighth oscillator phase $\phi_{8LO1}(t)$ during the fourth time slot after the switching of the oscillator frequency $f_{7LO1}$, $f_{8LO1}$ of the first node M.

In particular embodiments, the phase offset $\phi_{OFS}$ between the phase locked loop 120 of the first node M and the phase locked loop 120 of the second node S remains constant as well. Due to the determination of the difference according to formula (2), the phase offset $\phi_{OFS}$ is subtracted out. In particular embodiments, the synchronization imprecision $+\Delta t$ may occur.

In FIG. 1b, the transmission of the third frame F3 and of the fourth frame F4 between the nodes M, S is shown schematically. In particular embodiments, the third frame F3 and the fourth frame F4 are generated by the transmission unit 30 of the second node and upmixed by the local oscillator signs $S_{LO2}$ with the fifth oscillator frequency $f_{5LO2}$ with the fifth oscillator phase $\phi_{5LO2}(t)$, respectively the sixth oscillator frequency $f_{6LO2}$ with the sixth oscillator phase $\phi_{6LO2}(t)$ to the third carrier frequency $f_{TXch3}$ with the third transmission phase $\phi_{TX3}$, respectively to the fourth carrier frequency $f_{TXch4}$ with the fourth transmission phase $\phi_{TX4}$.

In particular embodiments, for example, the third frame F3 with the third area B3 and the service data $PSDU_3$ is transmitted in the third frequency channel CH3. In particular embodiments, for example, the fourth frame F4 with the fourth area B4 and the service data $PSDU_4$ is transmitted in the fourth frequency channel CH4. In particular emmbodiments, it is only necessary that a frequency difference between the first carrier frequency $f_{TXch1}$ and the second carrier frequency $f_{TXch2}$ is equal to a frequency difference between the third carrier frequency $f_{TXch3}$ and the fourth carrier frequency $f_{TXch4}$. In particular embodiments, as shown in FIG. 6, the four frames F1, F2, F3, and F4 may be transmitted only in two channels CH1, CH2.

In particular embodiments, the first node receives the third frame F3 with the third reception phase $\phi_{RX3}$ and the fourth frame F4 with the fourth reception phase $\phi_{RX4}$. The reception signal $RX_{F3}$, $RX_{F4}$ is downmixed by the seventh oscillator frequency $f_{7LO1}$ with the seventh oscillator phase $\phi_{7LO1}(t)$, and respectively the eighth oscillator frequency $f_{8LO1}$ with the eighth oscillator phase $\phi_{8LO1}(t)$. A reception unit 40 of the first node M determines a second difference $\Delta\phi_2$ between the third reception phase $\phi_{RX3}$ and the fourth reception phase $\phi_{RX4}$ from the sampling values Sp3 of the third area B3 and fourth sampling values Sp4 of the fourth area B4 by a cross correlation filter KKF.

In particular embodiments, the separation error due to the relative frequency offset $fofs_{REL}$ of the two nodes M, S with respect to each other is only:

$$\Delta L = 2T_{SL} \cdot fofs_{REL} \cdot c \quad (16)$$

where c is the speed of light and $T_{SL}$ is the temporal length of the time slots $TS_M$, $TS_S$. The relative frequency offset $fofs_{REL}$ is obtained from a static frequency deviation of the quartz stabilized reference clocks of the two nodes M, S with respect to each other, and thus, a slightly different length of the time slots $TS_M$, $TS_S$ of the first node M and the second node S. In particular embodiments, the frequency deviation may be determined by the nodes M, S before or after and this error $\Delta L$ may be additionally computed.

In particular embodiments, the sequence and number of the time slots is variable. In particular embodiments, for example, the phase may also be kept during the switching from transmission to reception. In particular embodiments, different sequences of the time slots are possible, which may cause particularly rapid or particularly few channel changes. In particular embodiments, for example, a higher redundancy may be achieved with an increased number of measurements that have an improved statistical significance by averaging. In particular embodiments, the phase response is determined from a large number of frequency channels in the entire approved transmission band of the physical transmission channel. In particular embodiments, for example, inverse Fourier transformation is used for this purpose in order to determine the pulse response of the physical transmission channel.

This disclosure is not limited to the example embodiments shown in FIGS. 1 to 7b. In particular embodiments, for example, it is possible to establish other data as the first to fourth areas. In particular embodiments, the functionality of the example embodiment shown in FIG. 6 may be used for a radio system in accordance with the industry standard IEEE 802.15.4-20.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The present disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving at a first node a first data frame in a first reception signal having a first frequency and a first phase;
   receiving at the first node a second data frame in a second reception signal having a second frequency and a second phase;
   determining a first phase difference between the first phase and the second phase by correlating one or more first sampling values associated with data in the first data frame with one or more second sampling values associated with data in the second data frame
   wherein receiving the first data frame comprises downmixing the first reception signal with a third frequency and receiving the second data frame comprises downmixing the second reception signal with a fourth frequency, wherein switching from the third frequency to the fourth frequency is associated with one or more of:
   no phase shift; and
   a deterministic phase shift between a first oscillator phase of the third frequency and a second oscillator phase of the fourth frequency.

2. The method of claim 1, further comprising:
   generating at the first node a third data frame having a fifth frequency and a third phase;
   generating at the first node a fourth data frame having a sixth frequency and a fourth phase; and
   transmitting at the first node the third data frame and the fourth data frame.

3. The method of claim 1, further comprising determining one or more properties utilizing the first phase difference.

4. The method of claim 3, wherein the one or more properties comprise one of transit time, distance, or multiple path propagation in a transmission medium.

5. The method of claim 1, wherein data in the first data frame and the second data frame is the same.

6. The method of claim 1, wherein the one or more first sampling values are taken from a first area of the first frame by counting cycles of a reference clock signal and the one or more second sampling values are taken from a second area of the second frame by counting cycles of the reference clock signal.

7. The method of claim 1, wherein one or more of the first data frame and the second data frame conform to industry standard Institute of Electrical and Electronics Engineers (IEEE) 802.15.4.

8. A device comprising:
   a transceiver configured to:
   receive at a first node a first data frame in a first reception signal having a first frequency and a first phase;
   receive at the first node a second data frame in a second reception signal having a second frequency and a second phase; and
   determine a first phase difference between the first phase and the second phase by correlating one or more first sampling values associated with data in the first data frame with one or more second sampling values associated with data in the second data frame
   wherein receiving the first data frame comprises downmixing the first reception signal with a third frequency and receiving the second data frame comprises downmixing the second reception signal with a fourth frequency, wherein switching from the third frequency to the fourth frequency is associated with one or more of:
   no phase shift; and
   a deterministic phase shift between a first oscillator phase of the third frequency and a second oscillator phase of the fourth frequency.

9. The device of claim 8, the transceiver further configured to:
   generate at the first node a third data frame having a fifth frequency and a third phase;
   generate at the first node a fourth data frame having a sixth frequency and a fourth phase; and
   transmit at the first node the first third data frame and the fourth data frame.

10. The device of claim 8, the transceiver further configured to determine one or more properties utilizing the first phase difference.

11. The device of claim 10, wherein the one or more properties comprise one of transit time, distance, or multiple path propagation in a transmission medium.

12. The device of claim 8, wherein data in the first data frame and the second data frame is the same.

13. The device of claim 8, wherein the one or more first sampling values are taken from a first area of the first frame by counting cycles of a reference clock signal and the one or more second sampling values are taken from a second area of the second frame by counting cycles of the reference clock signal.

14. The device of claim 8, wherein one or more of the first data frame and the second data frame conform to industry standard Institute of Electrical and Electronics Engineers (IEEE) 802.15.4.

15. A system comprising:

a first transceiver configured to:
- generate a first data frame having a first frequency and a first phase using a first oscillator frequency and a first oscillator phase;
- generate a second data frame having a second frequency and a second phase using a second oscillator frequency and a second oscillator phase;
- transmit the first data frame and the second data frame; and a second transceiver configured to:
- receive the first data frame and the second data frame; and
- determine a first phase difference between the first phase and the second phase by correlating one or more first sampling values associated with data in the first data frame with one or more second sampling values associated with data in the second data frame, wherein the one or more first sampling values are taken from a first area of the first frame by counting cycles of a reference clock signal and the one or more second sampling values are taken from a second area of the second frame by counting cycles of the reference clock signal.

16. The system of claim 15, wherein:

the second transceiver is further configured to:
- generate a third data frame having a third frequency and a third phase using a third oscillator frequency and a third oscillator phase;
- generate a fourth data frame having a fourth frequency and a fourth phase using a fourth oscillator frequency and a fourth oscillator phase;
- transmit the third data frame and the fourth data frame; and the first transceiver is further configured to:
- receive the third data frame and the fourth data frame; and
- determine a second phase difference between the third phase and the fourth phase by correlating one or more third sampling values associated with data in the third data frame with one or more fourth sampling values associated with data in the fourth data frame.

17. The system of claim 15, wherein switching from the first oscillator frequency to the second oscillator frequency is associated with a deterministic phase shift occurring between the first oscillator phase and the second oscillator phase.

18. The system of claim 15, the second transceiver further configured to determine one or more properties utilizing the first phase difference.

19. The system of claim 18, wherein the one or more properties comprise one of transit time between the first transceiver and the second transceiver, distance between the first transceiver and the second transceiver, or multiple path propagation in a transmission medium between the first transceiver and the second transceiver.

20. The system of claim 15, wherein one or more of the first data frame and the second data frame conform to industry standard Institute of Electrical and Electronics Engineers (IEEE) 802.15.4.

* * * * *